United States Patent
Van Rens

(10) Patent No.: US 8,096,068 B2
(45) Date of Patent: Jan. 17, 2012

(54) DISPLAY DEVICE AND ELECTRONIC APPLIANCE FOR USE IN COMBINATION THEREWITH

(75) Inventor: Bas Jan Emile Van Rens, Eindhoven (NL)

(73) Assignee: Creator Technology B.V., Breda (NL)

( * ) Notice: Subject to any disclaimer, the term of this patent is extended or adjusted under 35 U.S.C. 154(b) by 1429 days.

(21) Appl. No.: 10/538,095

(22) PCT Filed: Dec. 5, 2003

(86) PCT No.: PCT/IB03/05772
§ 371 (c)(1),
(2), (4) Date: Jun. 8, 2005

(87) PCT Pub. No.: WO2004/053818
PCT Pub. Date: Jun. 24, 2004

(65) Prior Publication Data
US 2006/0107566 A1    May 25, 2006

(30) Foreign Application Priority Data
Dec. 10, 2002  (EP) ..................................... 02080178

(51) Int. Cl.
*G09F 19/00*    (2006.01)
(52) U.S. Cl. .......................................... 40/515; 40/514
(58) Field of Classification Search .................... 40/514, 40/517, 515
See application file for complete search history.

(56) References Cited

U.S. PATENT DOCUMENTS

| 6,297,905 B1 | 10/2001 | Takamoto et al. |
| 2002/0070910 A1 | 6/2002 | Fujieda et al. |

FOREIGN PATENT DOCUMENTS

| JP | 96848/1993 | 12/1993 |
| JP | 06235973 A | 8/1994 |
| JP | 07028395 A | 1/1995 |
| JP | 3029852 | 7/1996 |
| JP | 11-143386 A | 5/1999 |
| JP | 11143386 A | 5/1999 |
| JP | 2000019980 A | 1/2000 |
| JP | 2000131766 | 5/2000 |
| JP | 3081027 A | 8/2001 |
| JP | 2002182582 A | 6/2002 |
| JP | 2004-536475 | 12/2004 |
| WO | WO 02/47363 A2 | 6/2002 |

OTHER PUBLICATIONS

Japanese Translation of Official Action mailed Jun. 26, 2009 in corresponding Japanese patent application.

*Primary Examiner* — Casandra Davis

(57) ABSTRACT

The display device of the invention comprises a flexible display element that can be extended in rollable fashion between a first position and a second position. In the first position the element is present in a housing and in the second position it is at least partially visible. The display element is supported in its second position by foldable arms. According to the invention a foldable arm comprises means which facilitate the extension of the display from the first to the second position and from the second position to a further position. These means also counteract any tendency of the display to return by itself from the second or any further position to the first position.

9 Claims, 3 Drawing Sheets

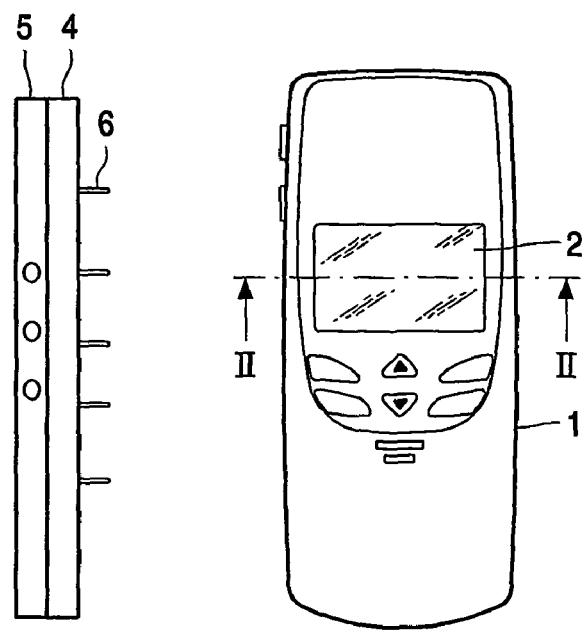
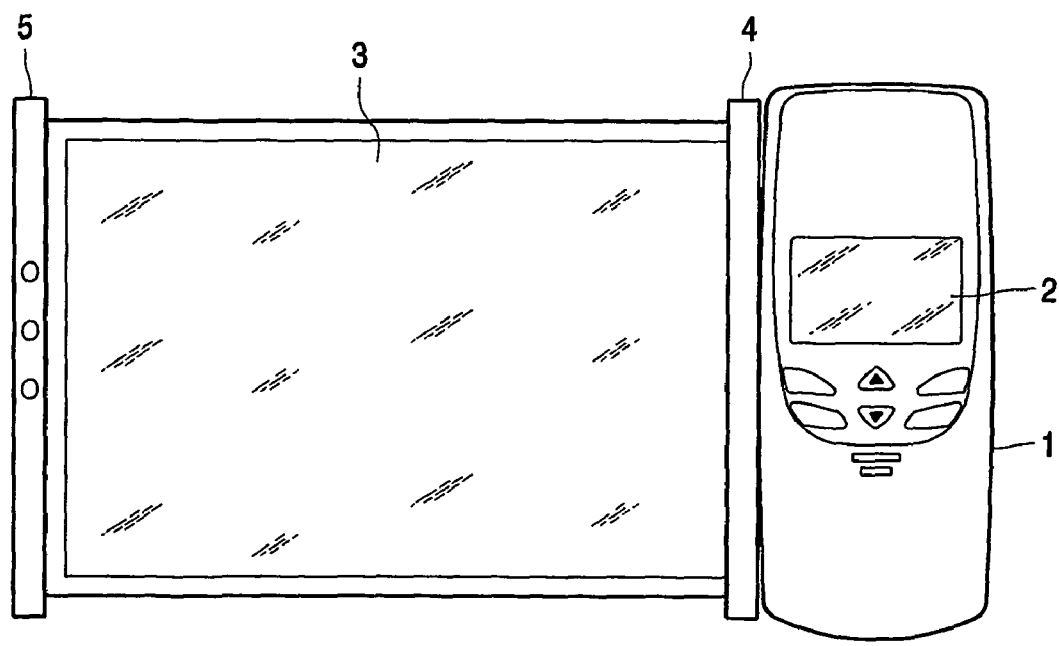
FIG. 1a
FIG. 1b

DISPLAY DEVICE AND ELECTRONIC APPLIANCE FOR USE IN COMBINATION THEREWITH

FIELD OF THE INVENTION

The invention relates to a display device comprising a display which is flexible and which may be present in both a first and a second position, in which first position the display is at any rate at least largely rolled up around a shaft in a housing and in which in a second position at least part of the display is visible, which display device is provided with support means comprising a foldable arm which arm is foldable around a first hinging point and can be folded up along the shaft when the display is in the first position, and which arm supports the display in the second position.

The invention also relates to an electronic appliance suitable for displaying information on a display device.

BACKGROUND

Such a display device is known from US2002/0070910 A1. The known display device is a device for mobile communication comprising a display referred to as arrayed waveguide display. Furthermore, a winding device is present for rolling up the display in the housing. A user can pull the display out of the housing to show information. To support the display in the second, extended position, a foldable arm is present. In this respect it should be observed that the second position is not restricted to the position in which the display is completely extended and fully visible. The second position is a position in which the display is at least partly visible, for example for 25%, 40% or 80%.

One of the ends of the arm is attached to an edge of the housing which contains a slot for the display to be moved through. The other end is attached to the display. The result of this is that the user can hold the display with only one hand even when the display is in the second position. The winding device comprises a spring and a cam as is also used in a projector screen. To pull out the display it is only necessary to pull a handle. To roll up the display the user is to pull up the handle slightly further to release the cam. Subsequently, because of the operation of the spring, the display rolls up by itself. Alternatively, also a button may be present for releasing the display.

SUMMARY OF THE INVENTION

It is a disadvantage of the known display that the winding device can show wear very fast when the device is frequently pulled out and pushed in. This may lead to the cam no longer offering sufficient resistance when the display is fully drawn out. This may otherwise lead to the fact that as a result of the drawing out the winding device no longer functions and the display can be pushed in only with very much effort.

Therefore, it is an object of the invention to provide a display device of the type defined in the opening paragraph in which a more robust mechanism is implemented for rolling out and pulling in the display than with the known winding device.

This object is achieved in that the display device comprises extending means which facilitate extending the display to the second position and which counteract a tendency of the display to return by itself from the second position to the first position. The extending means of the invention are particularly in a more released state when the display is in the second position, and particularly when the whole has been drawn out.

Ideally, the second position thus forms a position in which there is a balance of forces. A cam may then be completely omitted. In addition to a second position, also third and further positions may be provided in which a balance of forces is realized in each of them. A balance of forces is preferably realized in each of the positions. Pulling out the display from the first to the second position can be facilitated by the extending means. These means may also facilitate extending from a third position in between the first and second positions (for example at 20%) to the second position (for example at 50%) or to a further position (for example at 90%).

It is an advantage of the invention that there is much less chance of the display unexpectedly rolling up as a result of shocks, impact or movement of the display in certain directions. The display may slightly roll back of course, but as a result of the in-built opposing forces this happens relatively slowly and only to a limited extent. The advantage of this is naturally a greater safety particularly for young and elderly users. A further advantage is that no pens that may damage the display can be rolled in when the display is rolled up unexpectedly.

The tendency of the display to roll up by itself may also be caused by the presence of a spring in the display device according to the invention. On the other hand, frictional forces may play a role, or the substrate of the display—more particularly the substrate with an electro-optical layer—can be pulled out in lateral direction when the display is manufactured. The result of this is that a tension is included in the material. The opposing forces are preferably realized with elastic forces such as by extending a spring or the like. On the other hand, however, the opposing forces may be realized by, for example, piezoelectric elements, by gas pressure, by an electromotor or by a combination of such means. Where a spring is preferably attached to the housing, a piezoelectrical element is preferably mounted on a carrier such as a printed circuit board. This carrier is in its turn mounted on the housing in known fashion.

In a particularly favorable embodiment the foldable arm is hollow and the extending means comprise a cable and a first pivot, which pivot is located at the first hinging point and has an outer edge. The cable extends in the hollow foldable arm and is attached to a point of suspension in or on the housing. Furthermore, the cable comprises at least an elastic portion. Finally, the cable is present at the first hinging point along at any rate part of the outer edge of the first pivot when the display is in the first position. By guiding the cable along the outer edge of the pivot, the length to be bridged by the cable between a first and a second end of the arm is larger when the arm is folded than when the arm is spread out. The cable, more particularly the elastic portion thereof, is thus in an extended state in the first position.

The cable may be a cord of a single material or a wound and possibly enclosed wire containing various materials. Cables containing an internal metal wire are advantageous. The point of suspension for the cable is preferably located on a printed circuit board in the housing but may also be located on the housing itself. The pivot is preferably attached to the foldable arm. Furthermore, there may be more than one foldable arm and the foldable arm may have various hinging points. The hollow foldable arm is preferably beam-shaped to provide as good a support as possible. An alternative form, however, is the cylindrical form. It is observed that the hollow in the hollow foldable arm may comprise only a recess for the cable.

In a further embodiment the elastic portion is a spring which is located in the cable between the suspension point and the first hinging point. It is therefore advantageous because a spring having a desired elasticity can be selected.

The connection between the spring and the cable is realized, for example, by winding the cable around an end of the spring, whereas the other end of the spring is fixed to the point of suspension. Thanks to the use of a cable in the arm, the spring need not of necessity be a continuation of the arm. This offers a greater freedom of design of the device.

Another embodiment comprises locking means by which the display can be locked in at least one position. A first advantageous example of such locking means is a rotary disk by which a user can lock the display in a first position. Such a rotary disk is preferably located inside the housing, part of the edge of the rotary disk protruding through a slot-like opening in the housing. Such a rotary disk is particularly advantageous in combination with the spring as an elastic portion of the cable. The point of suspension of the cable is then located on the rotary disk, that is, at an eccentric point thereof. The spring which in first position is in extended state, is brought to a less extended or non-extended state by the rotation of the rotary disk. There is then no driving force for the extending. When at the same time there is a driving force for rolling up the display, the display will roll up by itself. Another advantageous embodiment of a locking means is an operating means such as a key or a function in a menu on a further display in the display device. This operating means can be connected with the same mechanism with a rotary disk, or another mechanism to reduce or enlarge the force on the spring or the cable. Another embodiment hereof utilizes an electric motor. It is an example of the use of an electronic control means that the use of the rollable display can be controlled by means of an identification code.

In another embodiment the rotary disk has a non-uniform diameter. A first example of this is a rotary disk having the form of an ellipse around which the cable is wound. This may provide that the forces of pulling out and rolling up the display are balanced over the entire rolling width of the display. This provides that the display can be rolled out over the entire width in a simple manner. A second example of this is a rotary disk with one or more local bulges along the edge of the rotary disk. Such a local variation of the radii of the rotary disk creates intermediate positions.

In a further embodiment reading means are available to determine to what degree the display in second position is extended. Furthermore, driving means are present with which an image can be reproduced only on the visible part of the display once the degree of extension of the display has been determined. This embodiment is pre-eminently suitable when the display can be present also in different positions from the first and second positions. This leads to the fact that not the entire display needs to be rolled out if one wishes to obtain certain information. This is advantageous in the case where a user does not have room for completely pulling out the display—such as, for example on a train. This is furthermore advantageous when the user wishes to rest the display on a hand and see only a few data. The reading means comprise, for example, one or more light sensors which are located on or near the rotary disk (if available). The position of the rotary disk then determines the incidence of light on each of the sensors. The reading means may also be coupled to a gear wheel, for example, in an electric motor. It will be evident that many variations are possible with this. The driving means are particularly a driving circuit which is available in each display device anyhow. The driving circuit is then programmed such that it adjusts the image format and stretches the information to be represented to this format in dependence on the signal from the reading means.

In a further variant a flexible display is subdivided into a number of segments oriented in parallel with the axis, in which each of the segments has a carrier layer. The presence of such a carrier layer is advantageous in that it provides an improved support of the display in extended state. The carrier layer is preferably available on the side of the display facing the user. In this embodiment the carrier layer is transparent. The advantage of this is that the display can better withstand local pressure. This is particularly favorable when the display has a what is called a touch-screen functionality. With this functionality a user can, by touching the display, call up a functionality of the display device or an appliance co-operating therewith. Such a touch-screen functionality is known to the expert.

The flexible display may be of the AWD type as described in US2002/0070910. However, the flexible display preferably has flexible transistors on which an electro-optical layer is deposited. Advantageous results are obtained with an electrophoretic electro-optical layer and with flexible transistors of a semiconductor material that has a chain-like molecular structure. Examples of this are semiconducting hardwires and organic semiconductors which are known per se to the expert in this field.

The display device may further comprise means for signal transmission to an adjustable external appliance. These means are, for example, the antenna, amplifier, transceiver and further component parts of a mobile telephone with which signal transmission according to a desired protocol (GSM, CDMA, W-CDMA, Bluetooth, W-Lan) can be realized. Alternatively, they may also be a connection for a cable by which the display device can be coupled to a computer or a computer network or a telecommunication network.

The display device may further advantageously be applied in combination with an electronic appliance. The display device may then be set up separately with signals being transmitted by wire or in wireless fashion between the electronic appliance and the display device. The display device may also be releasably attached to the electronic appliance. Examples of electronic appliances comprise mobile telephones and computers. An advantageous application is also the use for video conferencing or meetings with a large number of people. Such a combination is described inter alia in the non-prepublished application EP 02079131.5 (PHNL020942). This application further explains where a driving unit may be located.

These and other aspects of the invention are apparent from and will be elucidated with reference to the embodiments described hereinafter.

BRIEF DESCRIPTION OF THE DRAWINGS

In the drawings:

FIG. 1 shows the use of the display device in mobile telecommunication applications;

DETAILED DESCRIPTION OF THE DRAWINGS

Figure 2:
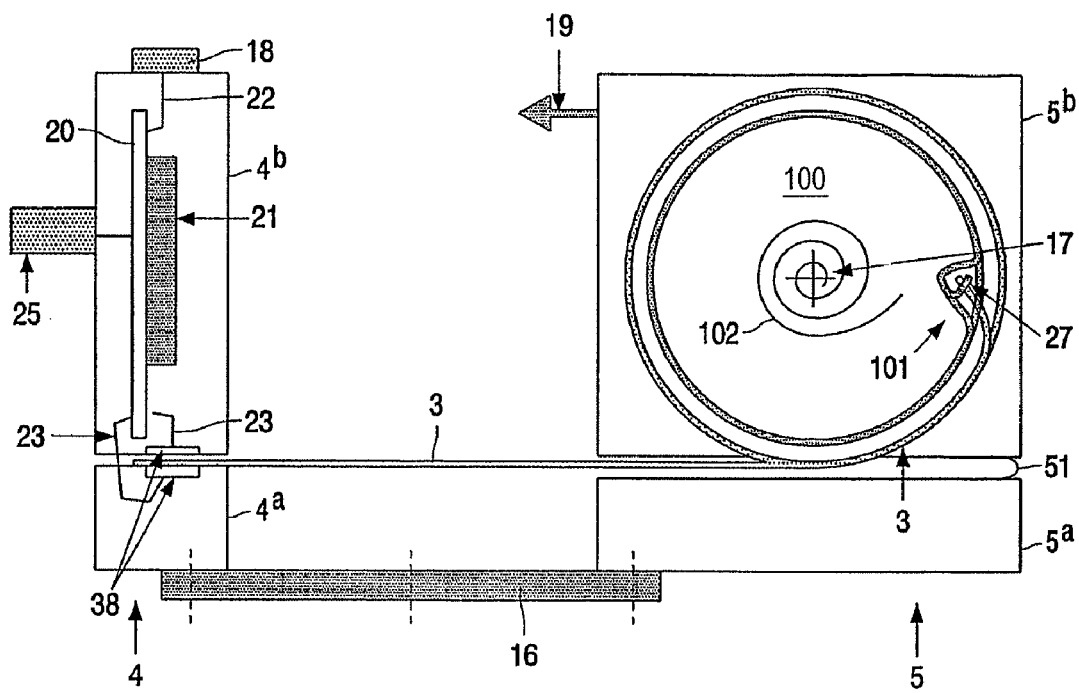
FIG. 2 gives a diagrammatic section of the housing of the display device.

The drawing Figures are not drawn to scale and only diagrammatic. Like reference numerals in different Figures refer to the same or like component parts. The Figures represent merely examples and are not determinative for the scope of protection.

FIG. 1 shows the use of a display device according to the invention in a first application. In FIG. 1a the use in a mobile telephone 1 is shown. Such a mobile telephone 1 comprises a display 2 having dimensions of roughly 2 by 2 cm, whereas the mobile phone itself has a size of 4 by 10 cm. A display device having a display 3 is here accommodated in a housing 4, 5 and can be electrically connected to the mobile telephone 1 via interconnect pins 6. The housing in this example comprises two different parts 4, 5. The display is here present in part 5 in rolled-up form, whereas part 4 contains further driving electronics and batteries. FIG. 1b shows the mobile telephone 1 comprising the display device in which the display 3 is rolled up.

FIG. 2 diagrammatically shows how a portion of the display 3 is accommodated in a first housing portion 5. The housing portion 5 in this example contains a first and a second part 5a, 5b which are interconnected by a hinge 51. The housing portion 5 has a winding device (shaft) 17 with which the display 3 can be rolled up. A spring 102 is present to provide a counterforce which engages the shaft 17 of a disk 100. The disk 100 has a slotted recess 101 with one or more hooks 27 over which the display 3 can be hooked. Supporting, foldable or hingeable arms 16 enhance the mechanical stability of the complete structure. The distance shown between the hingeable arms 16 and the display 3 is preferably of the order of several micrometers to several millimeters. It may happen that the arms 16 are not situated on the outside of the housing portions 4a, 5a but inside them.

Furthermore, this example diagrammatically shows a locking means 19. With this locking means 19 the housing portions 4 and 5 can be fixed to each other. A button 18 is present to release the locking means. The housing portion 4 comprises a printed circuit board 20 which accommodates a driving circuit 21 and electrical connections 22 to keys and other control means. It also accommodates electrical connections 23 to a series of contact surfaces 38. The contact surfaces 38 may be found on either one of the two sides of the display 3 or only on one side. The housing portion 4 may further comprise other integrated circuits, discrete semiconductor elements, batteries, antennas, speakers, cameras and the like. The antenna can provide a wireless connection between the appliance 1 and the display device 2 instead of the pin-shaped connection 25. More particularly, the driving circuits 21 or further circuit elements can be used for implementation of a (standard) data transmission protocol, that is to say, how to use different displays (with the different numbers of lines and columns and rows etc.) in different types of appliances.

In this example the housing comprises two portions 4a, 4b between which the display 3 can be clamped. In this way the conducting parts 6 can contact the contact surfaces 38 (in this example two-sided contacting is shown). The contact surfaces 38 are aligned by the guiding parts by means of aligning pins or recesses (in this case opening 24) or a form of optical or mechanical feedback. Since the display preferably contains only several contact surfaces, they may be large and a rough alignment is sufficient.

Furthermore, the housing 4 can contain only one slot for the display 3 to be passed through. It should be observed in this context that the width of the display (that is to say, the distance perpendicular to the shaft on which it is rolled up) is not restricted by the dimensions of the slot. It is the size of the housing portion 5 that determines the maximum width of the display 3, at any rate in this example. The display 3, however, may not only be rollable but foldable in a direction perpendicular to the width (the direction of rolling out).

Figure 3:
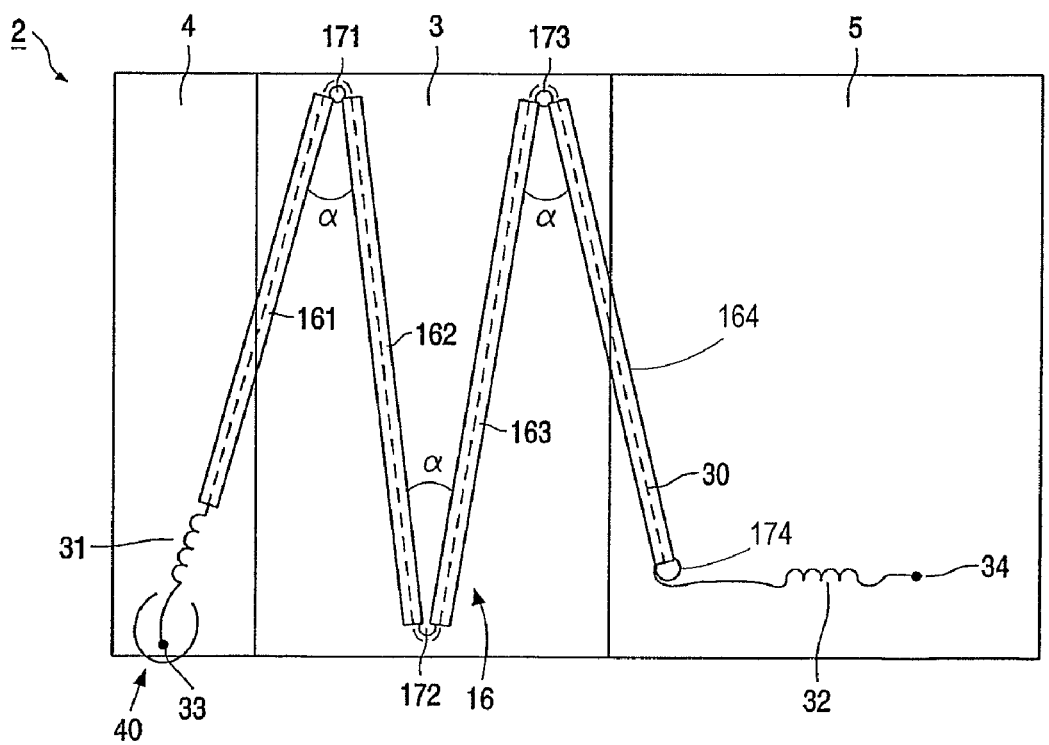
FIG. 3 shows a bottom view of the display device.

FIG. 3 gives a diagrammatic bottom view of the display device 2 of which FIG. 2 shows a sectional view. The display 3 and the foldable arm 16 are located between the first and second housing portions 4, 5 of the device. The arm 16 here comprises four arm portions 161, 162, 163, 164, but this is not essential. They are connected to each other via pivots 171, 172, 173, 174 at the hinging points of the arm 16. In the arm 16, which is hollow, runs a cable 30. The cable 30 is in this case a metal wire surrounded by insulating material. The cable 30 is suspended from a first and a second suspension point 33, 34 and has a first and a second elastic portion 31, 32 which are springs in this example. The first suspension point 33 has a variable position because it is located on a rotary disk 40. The outside edge of the rotary disk 40 is therefore located partly outside the housing portion 4.

Thanks to the springs 31, 32 the foldable arm 16 has a driving force for rolling out the display 3. The cable 30 runs over the outside of the pivots 171, 172, 173, 174. The length of the cable 30 along a pivot 171, 172, 173, 174 depends on the angle α between the arm portions. This length is (180−α/180)*π·r, where r is the radius of the pivot. With a radius of 0.25 cm and three and a half pivots (as in this example) the difference in length between the first position and the maximum second position is thus 2.75 cm. The opposing force of the spring 102 can thus be set by the choice of the springs 31, 32. If a larger difference is desired, the pivot 174 may be selected to be designed with a larger diameter.

It will be evident to the expert that FIG. 3 shows only a possible embodiment. The foldable arm 16 may as well have fewer arm portions 161-164. Furthermore, it may be that there is only a single housing in lieu of the two housing portions 4, 5. It may also be that the spring 102 is entirely absent. In lieu of this the cable may be elastic to a desired extent. Also electromotors may be present. Albeit in principle one electromotor will suffice, it is to be preferred to utilize a plurality of electromotors, for example one in each of the housing portions, which are both connected with the cable. By selecting a cable having a desired rigidity, it is not strictly necessary to couple one or more electromotors also to the foldable arms themselves. Alternatively, it is not impossible either to implement such a method as is proposed in the prior art.

Figure 4:
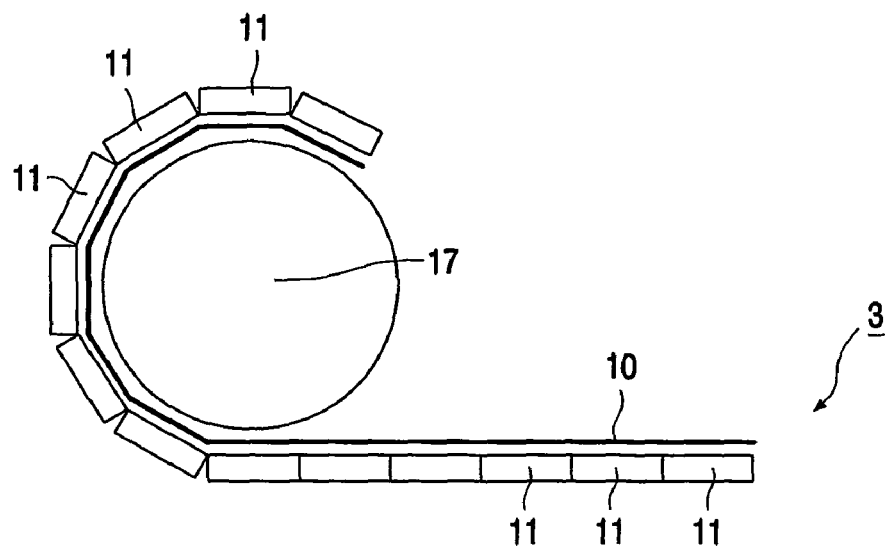
FIG. 4 shows a diagrammatic section of the display of the display device.

FIG. 4 shows an embodiment of the display 3 in a diagrammatic sectional view and in greater detail. The display here comprises a flexible stack of layers 10 and is subdivided into a number of segments 11 oriented in parallel with the shaft. Each of the segments 11 comprises a carrier layer, such as a layer of glass or of a glass-like polymer, known per se to the expert, whereas the flexible stack of layers 10 is continuous. The segments 11 are mutually connected via hinges between the segments 11 or via the stack 10. The segments are made, for example, by providing cuts in a hard substrate. The advantage of a display 3 having the segments 11 is that the display 3 can be bent only in one direction. Bending in the other direction, which renders interaction with the display 3 difficult, is suppressed. This makes it possible to hold the rolled-out display by an end, while it nevertheless remains flat. As a result, the number of arms may be limited preferably to 1. This is advantageous in that an arm portion extending from a suspension point to a hinging point or between two hinging points or between a hinging point and one end, can extend over the entire height of the display 3.

In the stack of layers there are transistors for pixels and conductive links to couple the transistors in desired manner and have them driven by a driving circuit. In addition, an electro-optical layer is present as well as anodes connected with the transistors and a cathode on either one of the two sides of the electro-optical layer. Preferably, the display contains thin-film transistors with a semiconductor of organic material, such as pentacene, poly-3-hexylthiophene, polythienylene-vinylene, polyphenylene-vinylene or polyarylamine. The electro-optical layer is preferably an electrophoretic or liquid crystalline electro-optical layer.

Figure 5:
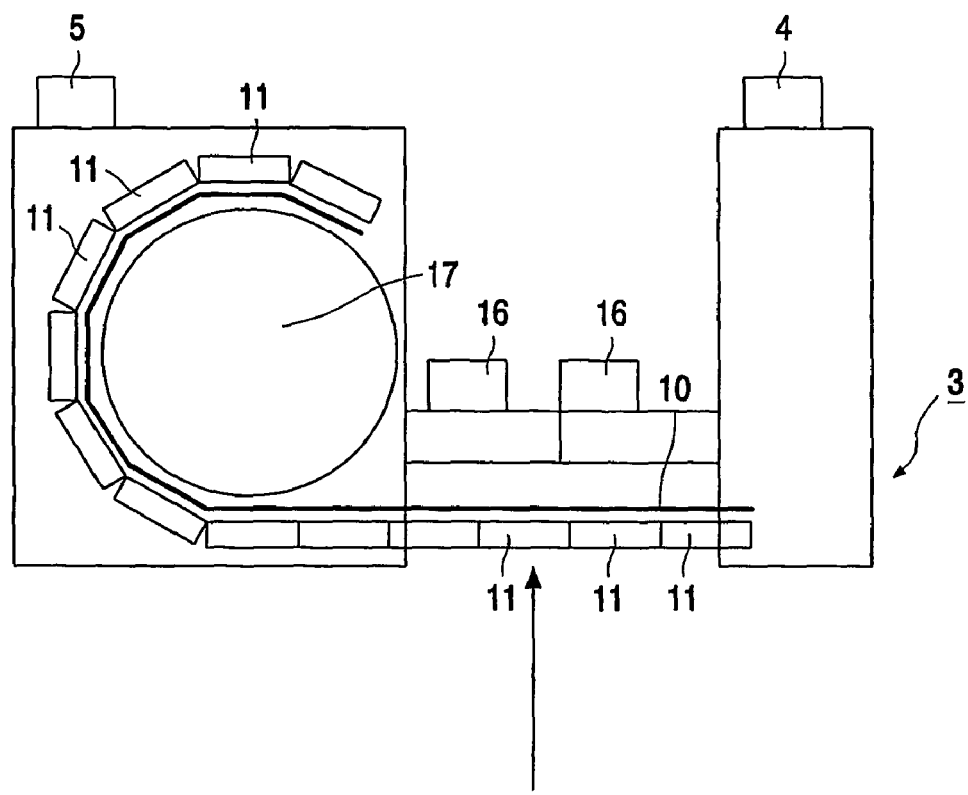
FIG. 5 shows the diagrammatic section of FIG. 4 in a further variant.

FIG. 5 shows how a rigid display can be achieved by utilizing the foldable arms 1 for supporting the display 3 and segments 11. The user now looks through the carrier layer from the direction indicated by the arrow. The carrier layer is therefore transparent. This makes the use of a touch screen possible.

Summarizing, a display device is provided having a flexible display which can be pushed in and extended by rolling between a first and a second position. In the first position the display is substantially in rolled-up form in a housing. In the second position it is at least partially visible. The display in its second position is supported by foldable arms. According to the invention such a foldable arm comprises means which facilitate extending the display to the second position. These means at the same time counteract any inherent tendency of the display to roll up by itself.

The invention claimed is:

1. A display device comprising:
    a display which is flexible and which may be present in both a first position and a second position, in which in the first position the display is at least largely rolled up around a shaft in a housing and in which in the second position at least part of the display is visible,
    extension structure to facilitate extending the display to the second position,
    wherein the extension structure comprises means for generating an extending force acting in an opposite direction with respect to a force driving the display towards the first position upon a transition towards the second position, the extension structure further arranged to counteract a tendency of the display to return by itself from the second position to the first position by balancing, in the second position, the extending force and the force driving a display towards the first position when in the second position, and
    wherein locking means are present with which the display can be locked in at least one position.

2. A display device according to claim 1, wherein the means for generating opposing forces comprise elastic means.

3. A display device, comprising:
    a display which is flexible and which may be present in both a first position and a second position, in which in the first position the display is at least largely rolled up around a shaft in a housing and in which in the second position at least part of the display is visible,
    extension structure to facilitate extending the display to the second position,
    wherein the extension structure comprises means for generating an extending force acting in an opposite direction with respect to a force driving the display towards the first position upon a transition towards the second position, the extension structure further arranged to counteract a tendency of the display to return by itself from the second position to the first position by balancing, in the second position, the extending force and the force driving a display towards the first position when in the second position,
    wherein the flexible display is subdivided into a number of segments oriented parallel to the shaft while each of the segments has a carrier layer.

4. A display device as claimed in claim 3, wherein the carrier layer is transparent and that reproduction of images during operation of the display takes place through the carrier layer.

5. A display device, comprising:
    a display which is flexible and which may be present in both a first position and a second position, in which in the first position the display is at least largely rolled up around a shaft in a housing and in which in the second position at least part of the display is visible,
    extension structure to facilitate extending the display to the second position; and
    means for signal transmission to an adjustable external appliance,
    wherein the extension structure comprises means for generating an extending force acting in an opposite direction with respect to a force driving the display towards the first position upon a transition towards the second position, the extension structure further arranged to counteract a tendency of the display to return by itself from the second position to the first position by balancing, in the second position, the extending force and the force driving a display towards the first position when in the second position.

6. A display device, comprising:
    a display which is flexible and which may be present in both a first position and a second position, in which in the first position the display is at least largely rolled up around a shaft in a housing and in which in the second position at least part of the display is visible,
    extension structure to facilitate extending the display to the second position,
    wherein the extension structure comprises means for generating an extending force acting in an opposite direction with respect to a force driving the display towards the first position upon a transition towards the second position, the extension structure further arranged to counteract a tendency of the display to return by itself from the second position to the first position by balancing, in the second position, the extending force and the force driving a display towards the first position when in the second position,
    wherein the display is provided with support means comprising a foldable arm that is foldable around a first hinging point and can be folded along the shaft when the display is in the first position, and wherein the foldable arm supports the display in the second position.

7. A display device as claimed in claim 6, wherein the foldable arm is hollow and the extension structure comprises a cable and a first pivot, the pivot being located on the first hinging point and having an outside edge, and which cable:
    extends in the hollow foldable arm;
    is attached to a suspension point in or on the housing;
    comprises at least an elastic portion and
    is present at the first hinging point along the outside edge of the first pivot when the display is in the first position.

8. A display device as claimed in claim 7, wherein the elastic portion is a spring which is located between the suspension point and the first hinging point.

9. A display device as claimed in claim 7, wherein the first pivot has a non-uniform diameter.

* * * * *